United States Patent
Cheung et al.

(10) Patent No.: US 7,461,282 B2
(45) Date of Patent: Dec. 2, 2008

(54) SYSTEM AND METHOD FOR GENERATING MULTIPLE INDEPENDENT, SYNCHRONIZED LOCAL TIMESTAMPS

(75) Inventors: Francis Cheung, Del Mar, CA (US);
Iue-Shuenn Chen, San Diego, CA (US);
Ut Nguyen, San Diego, CA (US);
Rajesh Mamidwar, San Diego, CA (US); Brian Schoner, Fremont, CA (US); Dan Simon, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 182 days.

(21) Appl. No.: 10/848,160

(22) Filed: May 19, 2004

(65) Prior Publication Data
US 2005/0039065 A1    Feb. 17, 2005

Related U.S. Application Data

(60) Provisional application No. 60/495,129, filed on Aug. 15, 2003.

(51) Int. Cl.
*G06F 1/14* (2006.01)
(52) U.S. Cl. .................. 713/400; 713/502; 386/13; 386/85; 348/513
(58) Field of Classification Search ......... 713/400–601; 714/700; 386/12, 13, 84, 85; 348/500–570, 348/388, 423, 21; 702/89
See application file for complete search history.

(56) References Cited

U.S. PATENT DOCUMENTS

| | | | | |
|---|---|---|---|---|
| 5,467,342 A * | 11/1995 | Logston et al. | ............. | 370/253 |
| 6,292,490 B1 * | 9/2001 | Gratacap et al. | ............ | 370/412 |
| 6,636,270 B2 * | 10/2003 | Gates et al. | ................ | 348/512 |
| 6,680,955 B1 * | 1/2004 | Le | ............... | 370/477 |
| 6,697,382 B1 * | 2/2004 | Eatherton | ................... | 370/503 |
| 6,791,995 B1 * | 9/2004 | Azenkot et al. | ............ | 370/436 |
| 6,967,951 B2 * | 11/2005 | Alfano | ....................... | 370/394 |
| 7,006,756 B1 * | 2/2006 | Keesen et al. | ................. | 386/85 |
| 7,031,306 B2 * | 4/2006 | Amaral et al. | .............. | 370/389 |
| 7,139,283 B2 * | 11/2006 | Quigley et al. | ............. | 370/432 |
| 2004/0008661 A1 * | 1/2004 | Myles et al. | ................ | 370/350 |
| 2004/0170199 A1 * | 9/2004 | Golan et al. | ................ | 370/516 |

* cited by examiner

*Primary Examiner*—Thuan N Du
(74) *Attorney, Agent, or Firm*—Sterne Kessler Goldstein & Fox, p.l.l.c.

(57) ABSTRACT

A system and method is provided for generating and using multiple synchronized local program timestamps in a media processing system. The system includes an input processor, one or more local timestamp insertion modules, one or more parsers, and an input buffer. Each local program timestamp module includes a clock reference recovery module, a local program clock synchronized to the system time clock of a program source, and a timestamp generator. The system also includes one or more processing modules such as record modules, transmission modules, and display modules. When a data packet is received by the media processing system, the local timestamp insertion module appends a timestamp to the data packet. The timestamp is based on the synchronized local program clock for the program associated with the data packet. The processing modules utilize the synchronized local timestamps and their associated local program clock in a variety of applications.

13 Claims, 7 Drawing Sheets

FIG. 1

PRIOR ART

SYSTEM AND METHOD FOR GENERATING MULTIPLE INDEPENDENT, SYNCHRONIZED LOCAL TIMESTAMPS

CROSS REFERENCE TO RELATED APPLICATIONS

This application claims priority to U.S. Provisional Application No. 60/495,129, entitled "System and Method for Generating Multiple, Independent, Synchronized Local Timestamps," filed Aug. 15, 2003, which is incorporated herein by reference in its entirety.

FIELD OF THE INVENTION

The present invention relates to multimedia data processing, and more particularly, to the generation and use of synchronized local timestamps.

BACKGROUND OF INVENTION

In recent years, the number and variety of content creation services available to consumers has increased dramatically. Consumers can now receive hundreds of program channels via satellite, cable, public data networks such as the Internet, private data networks, and wireless telephony networks. As a result, consumers are demanding receivers that can handle data from a variety of multimedia sources. In addition, the sophistication of applications driven by these services requires precise timing to be maintained between transmitters and receivers.

In many multimedia applications, the receiving system uses a system time clock that is independent of the system time clock of the transmitting system. Because these system time clocks are asynchronous, the receiver clock may run at a slightly different rate than the transmitter clock. For example, when the receiver clock runs slower than the transmitter clock, data packets arrive faster than the receiver processes them causing the input buffer to overflow. In addition, the lack of precise timing between the transmitter and receiver creates deleterious effects on video display such as lack of synchronization between video and audio.

Figure 1:
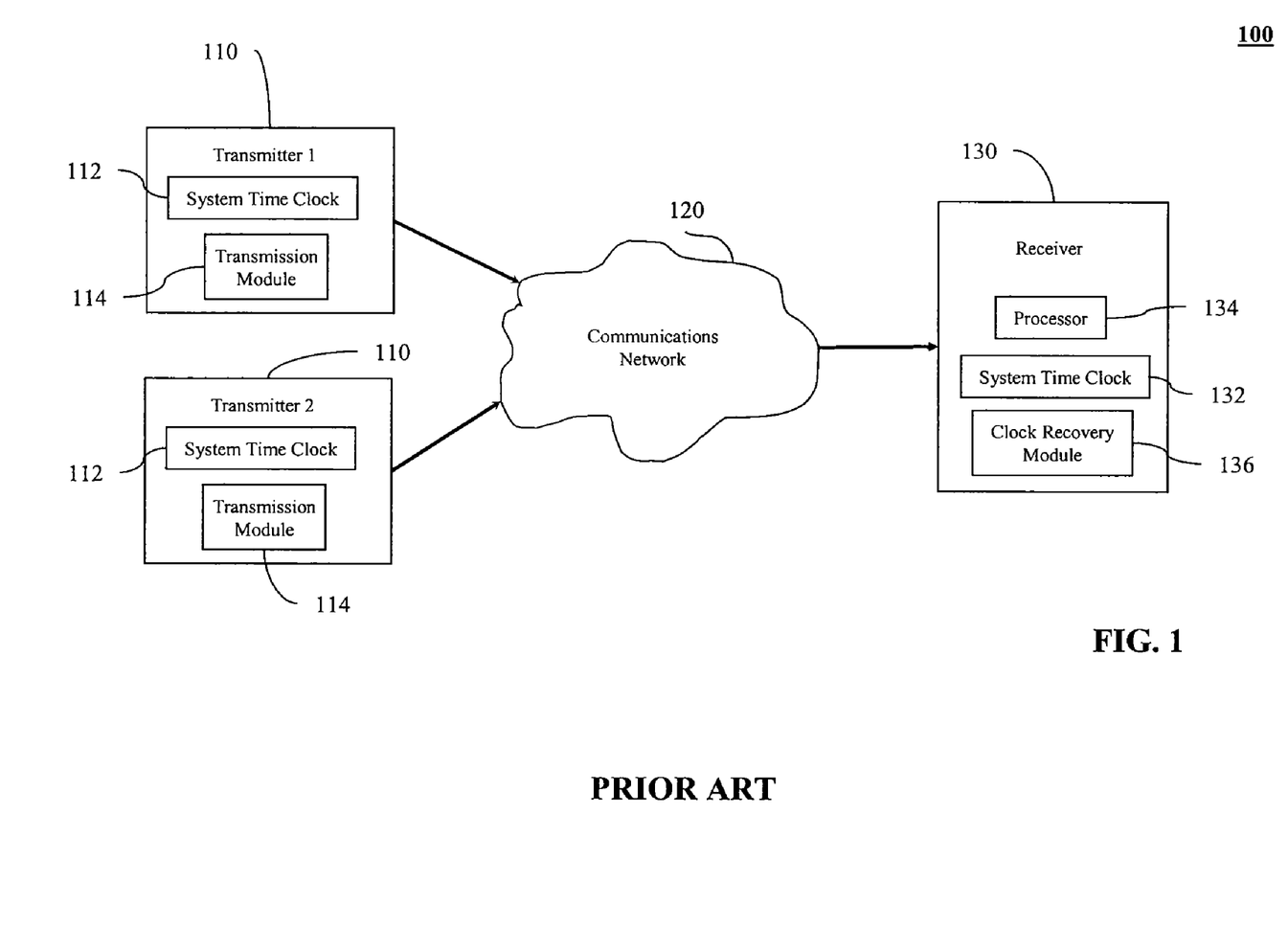
FIG. 1 is a block diagram of a conventional system for synchronizing the system time clock of the receiving system to the system time clock of the transmitting system.

One common technique to minimize the impact of these timing errors is to synchronize the system time clock of the receiver to the system time clock of the transmitting device. A conventional system 100 for performing this synchronization is shown in FIG. 1. System 100 includes one or more transmitters 110, a communications network 120 for transporting data packets, and a receiver 130. Each transmitter 110 has a system time clock 112 and a transmission module 114. Receiver 130 includes a processor 134 for receiving and processing data packets, a system time clock 132, and a clock recovery module 136.

Transmission module 114 generates a stream of data packets. The format of the transmission stream is defined by the technology supported by the transmitting and receiving system. Periodically, the transmission module will insert a clock reference value in the data packet being transmitted. In MPEG standards, this clock reference value is referred to as the program clock reference (PCR). The clock reference value represents the value of the transmitter system time clock at the time of insertion into the data packet. The clock recovery module 136 utilizes the clock reference values to synchronize the receiver system time clock to the transmitter system time clock.

This clock "locking" technique reduces timing errors associated with data packets from the transmitter on which the receiver clock is locked. However, in modern systems, data from multiple transmission sources (for example, multiple programs) are often multiplexed together in a single transport stream. The receiving system is able to synchronize to the system time clock of only one of these transmission sources. As a result, the data streams from the other transmission sources having different system time clocks are susceptible to the timing errors discussed above.

Figure 2:
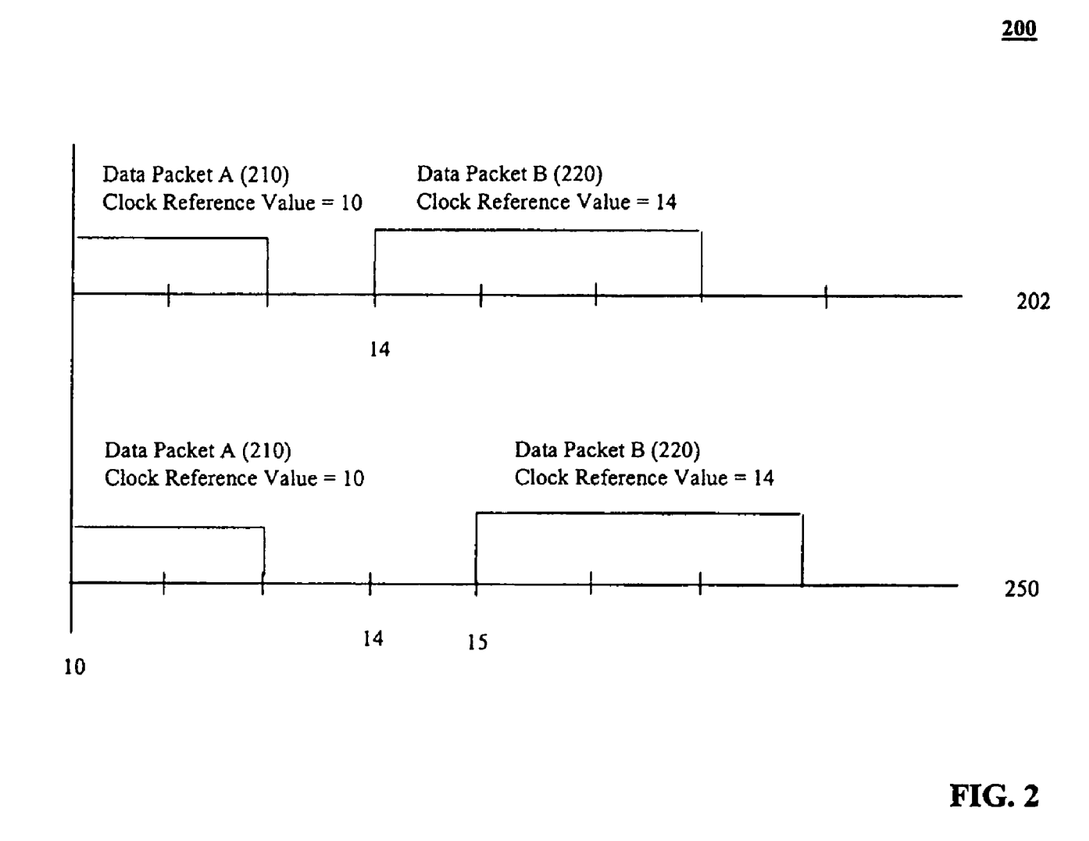
FIG. 2 illustrates the impact of internal delay on the clock reference values stored in data packets.

In addition, while being processed by the receiver, data packets may experience delay. This internal receiver delay introduces error into the clock reference values being forwarded to the downstream systems and applications. This error impacts the ability of the downstream system or application to synchronize its system time clock with the system time clock of the original transmitting system. FIG. 2 may be used to illustrate the impact of internal delay on the clock reference value. Time line 202 represents the relative times when packet A 210 and packet B 220 were received by the media processing system. Packet A 210 contains a clock reference value of 10. Packet B 220 contains a clock reference value of 14. Time line 250 represents the relative times when packet A and packet B were transmitted by the media processing system. Packet A is being transmitted at the same relative time, 10, as the clock reference value. However, packet B experiences delay in the system and is being transmitted at relative time 15. However, the clock reference value of that packet still indicates 14. Thus, a downstream system with a clock recovery module will be unable to accurately synchronize its clock because of the delay introduced.

A need therefore exists for a media processing system that can reduce timing errors caused by receiving and processing data packets from multiple disparate program transmitting devices.

A need further exists to minimize the impact of delays created within the media processing system while processing data packets from multiple disparate program transmitting devices.

SUMMARY OF THE INVENTION

The present invention is directed to a system and method for the generation and use of multiple independent synchronized local timestamps. In accordance with embodiments of the present invention, the media processing system includes an input processor, one or more local timestamp insertion modules, one or more parsers, and an input buffer. The input processor is coupled to one or more local timestamp insertion modules. Each local timestamp insertion module is coupled to a parser. The parsers are coupled to the input buffer. Each local timestamp insertion module includes a clock reference recovery module, a local program clock, and a timestamp generator.

In addition, the system includes multiple processing modules. Examples of processing modules include display modules, transmission modules, and record modules. A transmission module includes a clock reference correction module coupled to the local program clock for each program being processed by the system. The record module includes a timestamp format conversion module. The record and display modules are also coupled to the local program clock for each program being processed by the system.

In an embodiment of the present invention, when the media processing system receives data packets from multiple program sources, the input processor processes the data packets and distributes the data packets simultaneously to each local timestamp insertion module. Each local timestamp insertion module then generates a timestamp for each data packet. The local timestamp is based on the local program clock that is synchronized to the system time clock of the transmission source of the program being processed by the timestamp insertion module. The local timestamp insertion module appends a synchronized local timestamp onto each data packet. The local timestamp insertion module then communicates the data packet to a parser. The parser extracts the data packets associated with the program being processed. All other data packets are discarded by the parser. The parser then communicates the extracted data packets to the input buffer.

The input buffer distributes the data packets to the processing modules. The transmission processing module performs clock reference correction on the received data packets to correct for delays introduced within the media processing system. The record module records the synchronized local program timestamp with each data packet. When the timestamp format for recordation is different than the timestamp format for insertion, the record module performs format conversion. The display module uses the appended local program timestamps and the associated local program clock to pace playback of the data packets.

BRIEF DESCRIPTION OF THE FIGURES

The accompanying drawings, which are incorporated herein and form part of the specification, illustrate the present invention and, together with the description, further serve to explain the principles of the invention and to enable a person skilled in the pertinent art to make and use the invention.

The features and advantages of the present invention will become more apparent from the detailed description set forth below when taken in conjunction with the drawings in which like reference characters identify corresponding elements throughout. In the drawings, like reference numbers generally indicate identical, functionally similar, and/or structurally similar elements. The drawing in which an element first appears is indicated by the leftmost digit in the corresponding reference number.

DETAILED DESCRIPTION OF THE INVENTION

Figure 3:
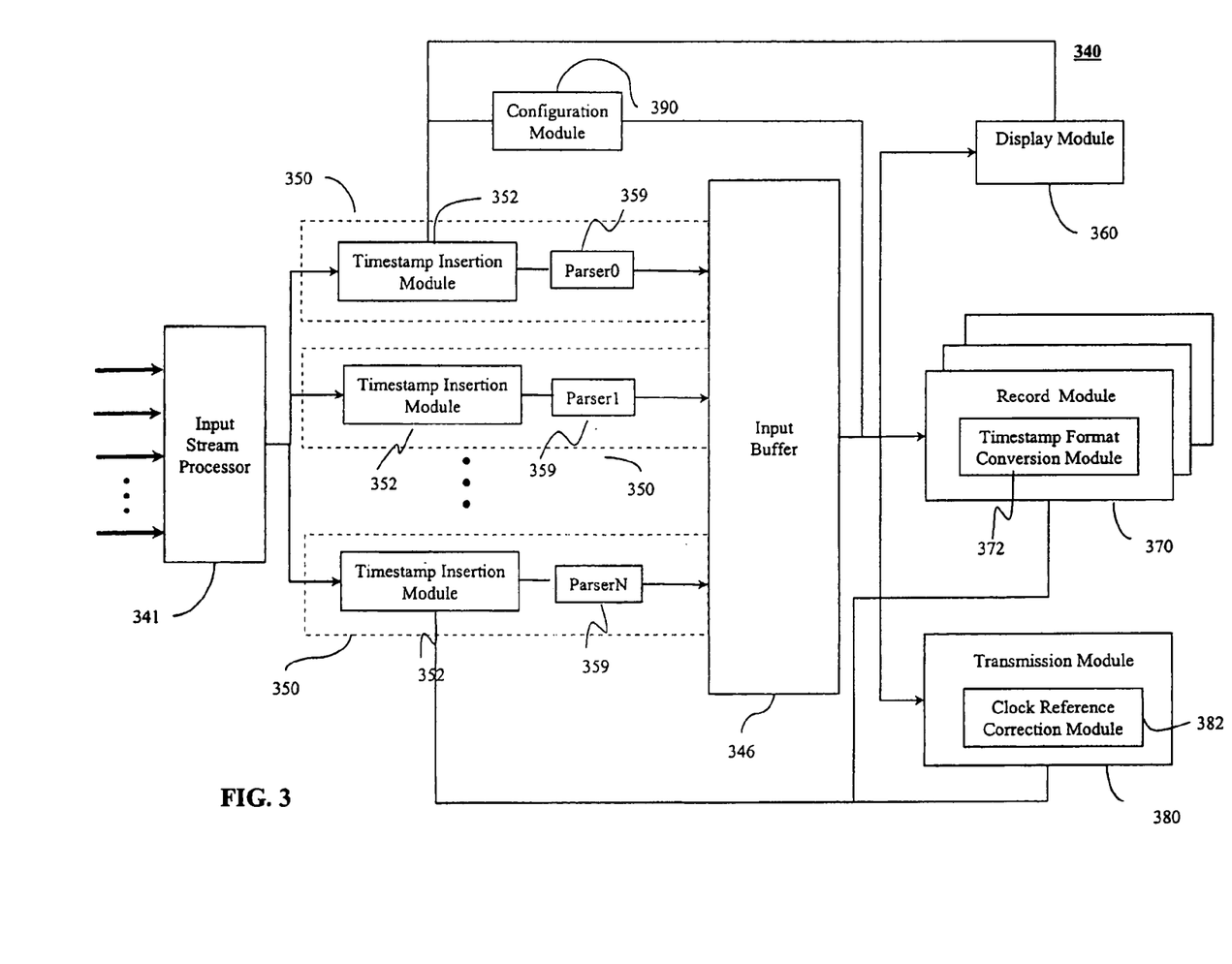
FIG. 3 is a block diagram of a media processing system in accordance with embodiments of the present invention.

FIG. 3 is a block diagram of a media processing system 340 for inserting and processing local timestamps in accordance with an embodiment of the present invention. Media processing system 340 may be implemented in any device capable of receiving data packets containing media content including television sets, cable set-top boxes, satellite television receivers, computers, personal digital assistants, and wireless devices. Persons skilled in the relevant art(s) will recognize that configurations and arrangements other than those provided in FIG. 3 can be used without departing from the spirit and scope of the present invention.

Media processing system 340 includes an input processor 341, one or more parsers 359, one or more local timestamp insertion modules 352, an input buffer 346, and a configuration module 390. Input processor 341 is configured to receive data packets through one or more input bands. Each input band includes data packets associated with one or more programs. These programs are typically multiplexed into a single data stream by an upstream device. The format and multiplexing scheme used by the upstream device can vary by manufacturer and by the location where the media processing device will be used.

When programs are multiplexed together, a means to identify which data packets belong to an individual program is needed. A common method of identification uses program identification (PID) information. In this approach, each data packet contains a PID value indicating with which program to associate the data packet. A program may be associated with one or more unique PID values. For example, a program may have a PID value for its video data packets and a PID value for its audio data packets. Thus, a program can be thought of as consisting of one or more PID streams.

After performing some initial processing on the data packets, input processor 341 distributes the data packets to an array of local timestamp insertion modules 352 and parsers 359. The number of local timestamp insertion modules and parsers can vary depending on the number of programs being processed by the media processing system 340. For ease of description, media processing system 340 can be logically represented as having one or more program processing blocks 350 coupled to the input processor. Each program processing block 350 handles data packets associated with a single program. The number of program processing blocks is equal to the number of programs being processed by the media processing system 340.

Each program processing block 350 includes a parser 359 coupled between a local timestamp insertion module 352 and the input buffer 346. In an alternative embodiment, the parser 359 is coupled between the input processor 341 and local timestamp insertion module 352. The local timestamp insertion module 352 appends a synchronized local program timestamp onto each data packet received. Parser 359 is configured to extract data packets having PID values associated with the program being processed by that program processing block 350.

Figure 4:
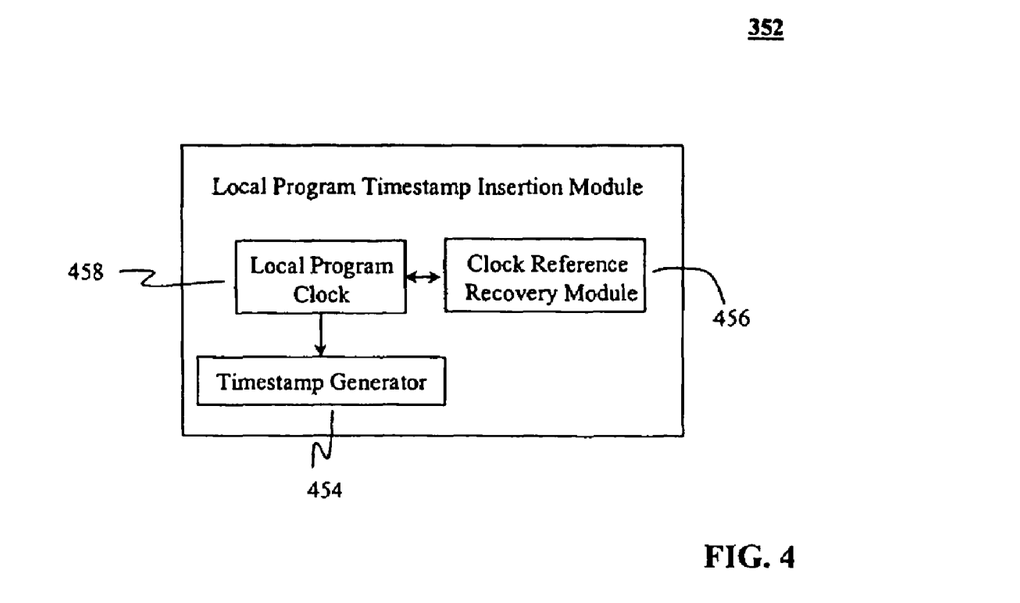
FIG. 4 is a block diagram of a local program timestamp insertion module in accordance with embodiments of the present invention.

FIG. 4 is a block diagram of local timestamp insertion module 352 in accordance with an illustrative embodiment of the invention. Although local timestamp insertion module 352 is preferably implemented in hardware, persons skilled in the relevant art(s) will appreciate that the functions of timestamp insertion module 352 may be implemented entirely in software or as a combination of hardware and software. Local timestamp insertion module 352 includes a program clock reference recovery module 456, a local program timestamp generator 454, and a synchronized local program clock 458. Program clock reference recovery module 456 is configured to synchronize the local program clock 458 to the system time clock of the program transmitter.

The synchronized local program clock 458 is coupled to the local program timestamp generator 454. The synchronized local program clock 458 drives the timestamp generator 454. In this way, the timestamps generated are effectively locked to the synchronized local program clock and the system time clock of the program transmitter.

Each timestamp insertion module 352 has a synchronized local program clock that is independent of the synchronized local program clocks used in the other timestamp insertion modules. Thus, the local program clocks are asynchronous in reference to each other.

Returning to FIG. 3, input buffer 346 receives data packets from the parsers 359, multiplexes the data packets together into a single stream, and distributes the stream for further processing. Input buffer 346 is coupled to one or more processing modules. In an embodiment of the present invention, processing modules include display modules 360, record modules 370, and transmission modules 380. Additional types of processing modules can also be supported by the media processing system. Each processing module is coupled to the local program clock 458 in each timestamp insertion module 352. Through these connections, the processing module has access to the local program clock for each program being processed by the media processing system. In addition, each processing module can process local program timestamps having any format supported by the media processing system.

Transmission module 380 is configured to transmit data packets to one or more downstream systems or applications. Transmission module 380 includes a clock reference correction module 382. Clock reference correction module 382 is configured to compensate for delays introduced after receipt of the data packets by the media processing system. Clock reference correction module 382 is coupled to the local program clock for each program being processed by the media processing system. Clock reference correction module 382 is preferably implemented in hardware. Persons skilled in the relevant art(s) will appreciate that the functions of the clock reference correction module 382 may be implemented entirely in software or as a combination of hardware and software.

Record module 370 is configured to record data packets associated with one or more program channels. The method and format used for recording is dependent upon the technology being used by the media processing system. Record module 370 is coupled to the local program clock for each program being processed by the system. Record module 370 includes a timestamp format conversion module 372.

Display module 360 is configured to display received data packets. Display module 360 is coupled to the local program clock for each program being processed by the media processing system. The display module 360 uses the local program timestamps to pace playback of the data. Playback is driven by the local program clock associated with the program being processed by display module 360.

Configuration module 390 is coupled to each timestamp insertion module 352 and each record module 370. Configuration module 390 stores timestamp configuration information for each program. For example, configuration module 390 stores the format to be used when inserting the timestamp into a data packet and the format to be used by the record module when recording the timestamp. The timestamp configurations are set at system initiation either via internal or external software modules.

Figure 5:
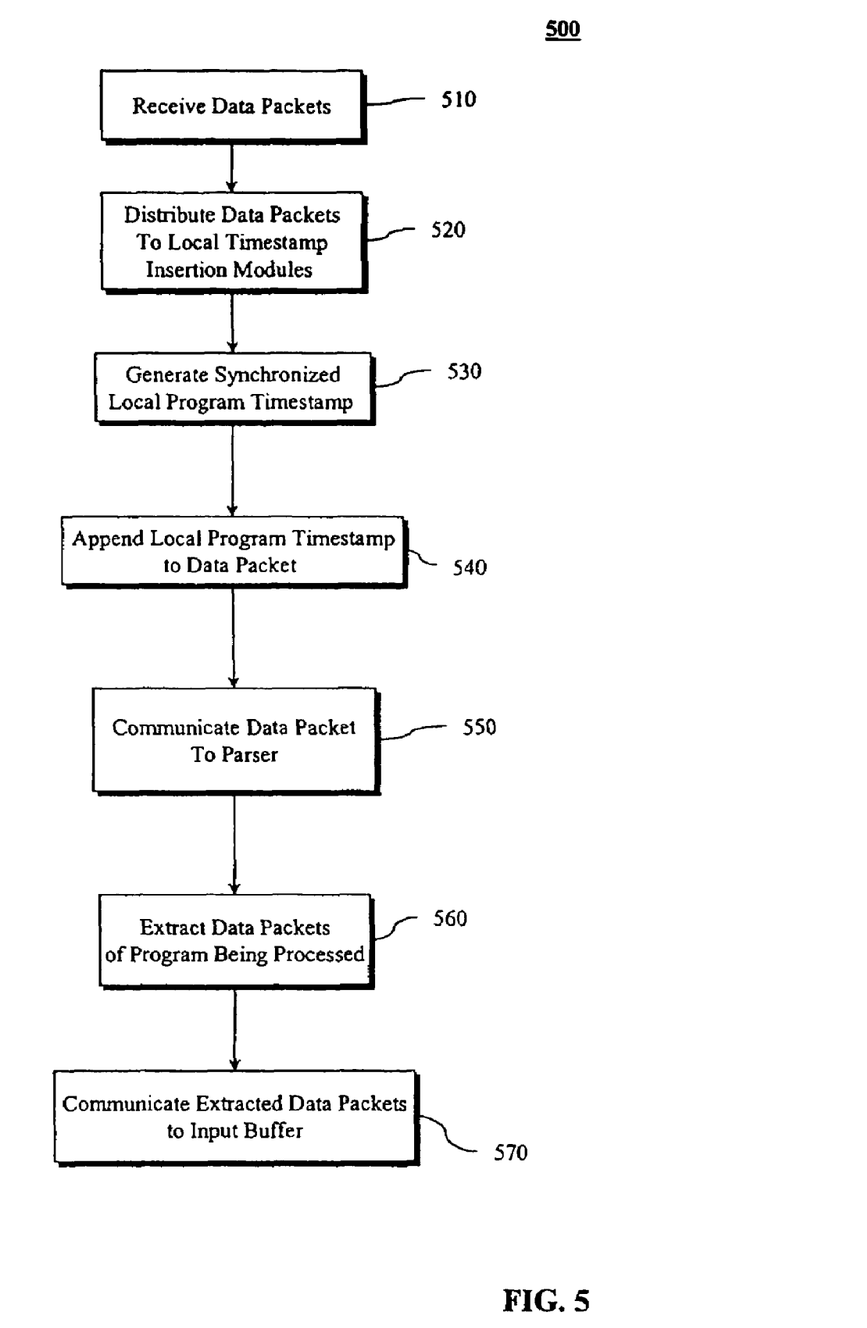
FIG. 5 is a flowchart illustrating a method for inserting local program timestamps into data packets in accordance with embodiments of the present invention.

FIG. 5 depicts a flowchart 500 of a method for generating a local program timestamp in accordance with an embodiment of the present invention. Flowchart 500 will be described with continued reference to the example broadcast data processing system 340 described in reference to FIGS. 3 and 4, above. However, the invention is not limited to those embodiments.

The method of flowchart 500 begins at step 510, in which input processor 341 receives data packets associated with multiple programs. After the input processor 341 performs initial processing on the data packets, the data packets are distributed to the local timestamp insertion module 352 in each logical program processing block 350 (step 520). The following steps are then performed simultaneously in each logical program processing block 350.

Figure 6:
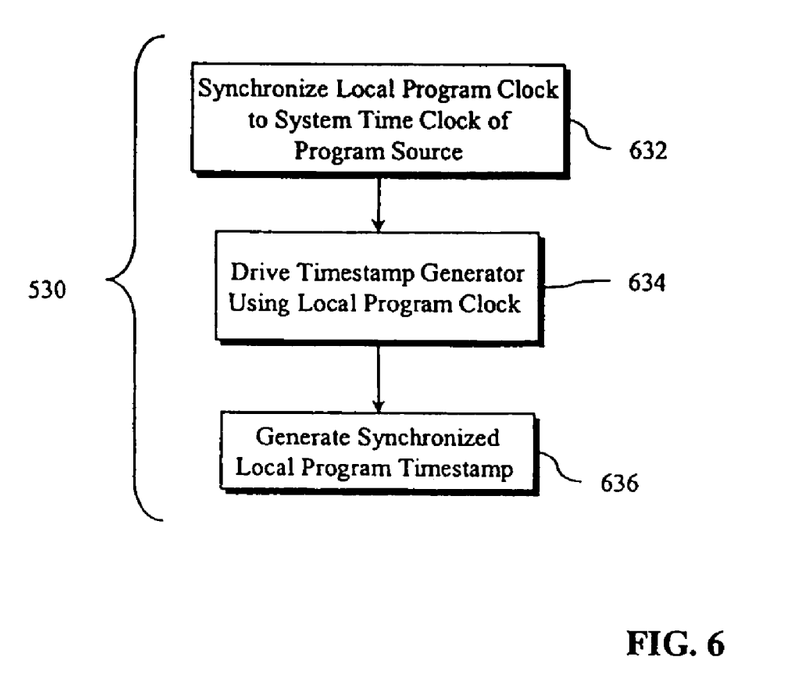
FIG. 6 is a flowchart illustrating a method for generating synchronized local program timestamps in accordance with embodiments of the present invention.

In step 530, the local timestamp insertion module 352 generates a synchronized local program timestamp. FIG. 6 depicts a flowchart of a method for generating the local timestamp in step 530. The clock reference recovery module 456 is continuously updating the local program clock to keep the local program clock synchronized with the system time clock of the program transmitter (step 632). This synchronization is typically performed by comparing the clock reference values contained in the data packets with the value of the local program clock. In step 634, the synchronized local program clock 458 is used to drive the local program timestamp generator 454. In step 636, the local program timestamp generator 454 generates a local program timestamp for the received data packet in the format pre-configured for the program being processed. The generated timestamp has a value equal to the time at which the data packet is received by the timestamp insertion module.

Returning to FIG. 5, after the timestamp has been generated, the timestamp insertion module 352 appends the local program timestamp to the data packet (step 540). In step 550, the data packet is communicated to the parser 359. The parser then examines the PID contained within the data packet. If the PID is associated with the program being processed, the parser extracts the data packet (step 560). If the PID is not associated with the program being processed, the data packet is discarded. In step 570, the parser communicates the extracted data packets, each containing a synchronized local program timestamp to the input buffer 346.

In an alternative embodiment of the present invention, the data packets are first distributed to the parser in each program processing block 350. The parser then extracts the data packets associated with the program being processed. In this embodiment, the local program timestamp is appended only to the extracted data packets.

Figure 7:
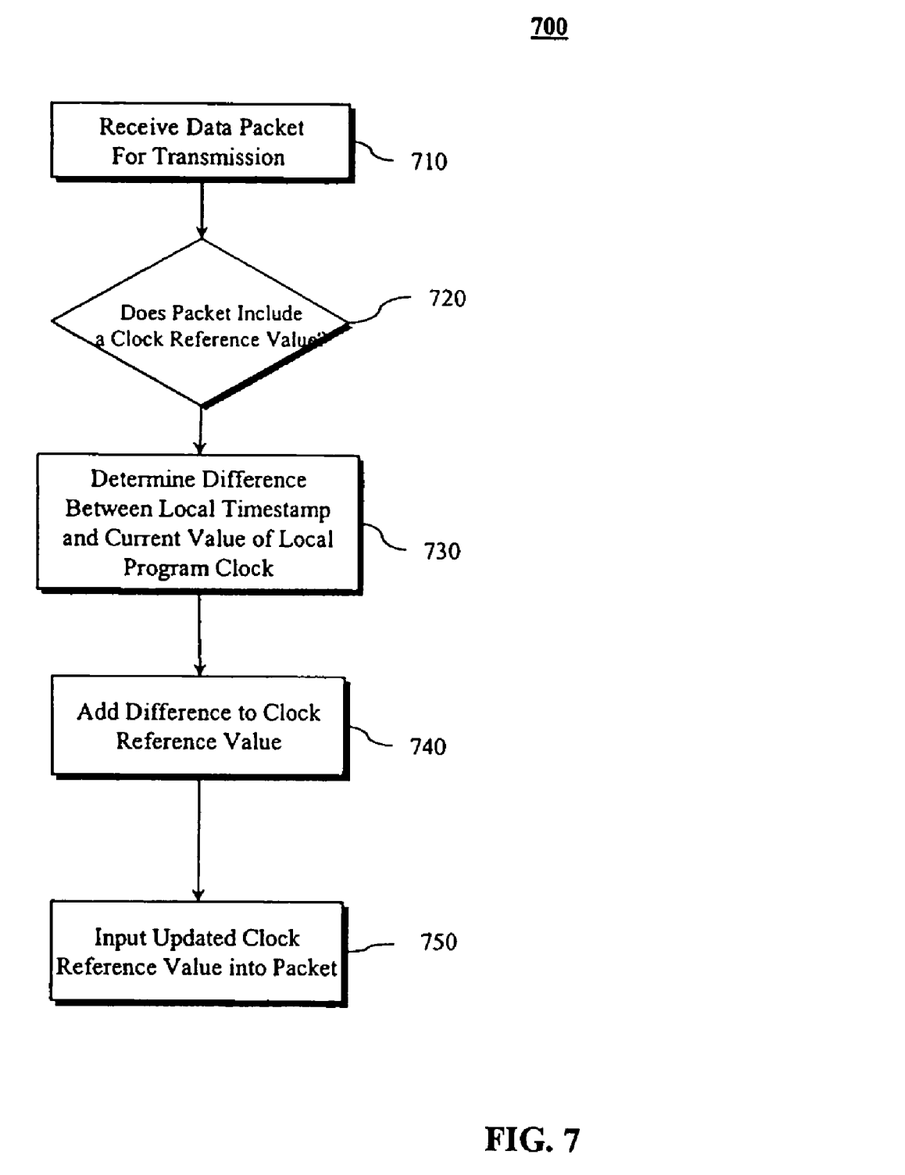
FIG. 7 is a flowchart illustrating a method for correcting a clock reference value prior to transmission of a data packet in accordance with embodiments of the present invention.

FIG. 7 illustrates a method 700 for using synchronized local program timestamps to update clock reference values to correct for delays introduced within the media processing system 340. As described above, a receiving system uses the clock reference values to synchronize its system time clock to the system time clock of the transmitting system. When the media processing system transmits data packets to a downstream system or application, the system is acting as an intermediate transmitter. In this scenario, the receiving downstream system must lock its system time clock to the original transmitting system time clock and not the clock of the intermediate media processing system. Therefore, any delay introduced by the media data processing system may impact the ability of the receiving system to accurately synchronize its clock.

Method 700 begins at step 710 when the transmission module 380 receives a data packet for transmission from the input buffer 346. In step 720, the transmission module 380 determines whether the data packet contains a clock reference value. If the packet contains a clock reference value, the clock reference correction module 382 determines the difference between the current reference value of the local program clock 458 associated with the program being processed and the value of the local timestamp appended to the data packet (step 730). In step 740, the clock reference correction module 382 adds the difference to the original clock reference value. The clock reference correction module 382 then inserts the updated clock reference value into the data packet (step 750). Prior to transmission, the transmission module 380 strips the appended program local timestamp from the data packet.

Local program timestamps also play an integral role in recording a program onto a medium. In accordance with the current invention, the local program timestamp is optimally recorded with each data packet. By recording the local program timestamp, the record module 370 can achieve efficiency in generating navigational information used in playback applications.

When a record module 370 receives a data packet containing a local timestamp, it first determines whether the timestamp is in the proper record format. The record format for the timestamp is dependent upon the standard being followed for recording. The record format for each program being processed by the media processing system 340 is pre-configured and stored in the configuration module 390. If the record format is the same as the insertion format, the timestamp is recorded with the data packet. If the record format is different than the insertion format, the timestamp format conversion module 372 converts the timestamp into the correct record format. The converted timestamp is then recorded with the data packet.

While various embodiments of the present invention have been described above, it should be understood that they have been presented by way of example, and not limitation. It will be apparent to persons skilled in the relevant art(s) that various changes in form and detail can be made therein without departing from the spirit and scope of the invention. Thus, the present invention should not be limited in any of the above-described exemplary embodiments, but should be defined only in accordance with the following claims and their equivalents.

What is claimed is:

1. A device for processing a plurality of data packets from a plurality of program sources multiplexed in a data stream comprising:
   an input processor configured to receive a plurality of data packets from the plurality of program sources in the multiplexed data stream and to distribute the plurality of data packets to a plurality of timestamp insertion modules, each timestamp insertion module associated with a corresponding one of the plurality of program sources, wherein each timestamp insertion module includes:
   a local program reference clock,
   a synchronizer that synchronizes the local program reference clock to a clock of an associated one of the plurality of program sources, and
   a local program timestamp generator configured to add a local program timestamp to each received data packet,
   wherein the local program reference clocks operate independently; and
   a transmissions module configured to receive a set of the data packets and further configured, for each packet in the set of data packets, to account for a delay introduced by processing within the device using the local program timestamp of the data packet and to remove the local program timestamp from the data packet prior to transmission to a destination.

2. The device of claim 1 further comprising:
   an input buffer coupled to outputs of the plurality of timestamp insertion modules; and
   a processing module coupled to an output of the input buffer.

3. The device of claim 2 wherein the processing module comprises a display module.

4. The device of claim 3 wherein the display module is coupled to an associated one of the local program clocks.

5. The device of claim 1 further comprising a configuration module coupled to the plurality of timestamp insertion modules.

6. The device of claim 5 wherein the processing module comprises a record module.

7. The device of claim 6 wherein the record module includes a timestamp format conversion module coupled to the configuration module.

8. The device of claim 1 wherein the transmission module includes a clock reference correction module coupled to an associated one of the local program reference clocks.

9. A method, in a multimedia processing device, for processing a plurality of data packets received from a plurality of program sources multiplexed in a single data stream, the method comprising the steps of:
   receiving the plurality of data packets from the plurality of program sources in the multiplexed data stream;
   distributing the data packets to a plurality of local timestamp insertion modules wherein each local timestamp insertion module is associated with a corresponding one of the plurality of program sources;
   in each local program timestamp insertion module,
     synchronizing a local program clock to a system time clock of the associated one of the plurality of program sources,
     generating a local program timestamp using the synchronized local program clock, wherein the local program clocks operate independently; and
     appending the local program timestamp to each received data packet;
   distributing a set of data packets to a transmissions module;
   for each data packet in the set of data packets,
     determining a delay introduced by processing within the multimedia processing device using the local program timestamp for the data packet;
     updating a clock reference value for the data packet to account for the delay; and
     removing the local program timestamp from the data packet prior to transmission.

10. The method of claim 9 wherein determining the delay comprises:
    determining whether the data packet contains the clock reference value;
    determining a difference between a current value of the associated local program clock and the value of the appended timestamp; and
    adding the difference to the clock reference value contained in the data packet.

11. The method of claim 9 further comprising:
    determining whether a timestamp insertion format for a data packet is the same as a timestamp record format for the data packet; and
    converting the timestamp into the record format when the formats are different.

12. The method of claim 9 further comprising:
    pacing playback of the data packets using the local program reference clock associated with a program being displayed.

13. A method, in a media processing device, for updating a clock reference value contained in a plurality of data packets in a multiplexed data stream, each data packet including a program identifier and program data, the method comprising the steps of:
    extracting a set of data packets from the multiplexed data stream having a first program identifier;

synchronizing a local program reference clock with a clock associated with a source of the program data included in the set of data packets;

for each data packet in the set of data packets, appending a local program timestamp to the data packet based on the local program reference clock;

determining whether the data packet being processed contains a clock reference value;

determining the difference between the current value of the local program clock used to generate the local program timestamp and the value of the appended local program timestamp;

adding the difference to the clock reference value contained in the data packet to generate an updated clock reference value for the data packet; and removing the local program timestamp from the data packet prior to transmission of the data packet.

* * * * *